March 10, 1959 — W. H. SCHYMIK — 2,877,289
ENCLOSED BUS SECTOR
Filed Jan. 13, 1953 — 6 Sheets-Sheet 1

INVENTOR.
WALTER H. SCHYMIK
BY Ostrolenk + Faber
ATTORNEYS

March 10, 1959 W. H. SCHYMIK 2,877,289
ENCLOSED BUS SECTOR
Filed Jan. 13, 1953 6 Sheets-Sheet 2

INVENTOR.
WALTER H. SCHYMIK
BY
Ostrolenk & Faber
ATTORNEYS

March 10, 1959 W. H. SCHYMIK 2,877,289
ENCLOSED BUS SECTOR
Filed Jan. 13, 1953 6 Sheets-Sheet 3
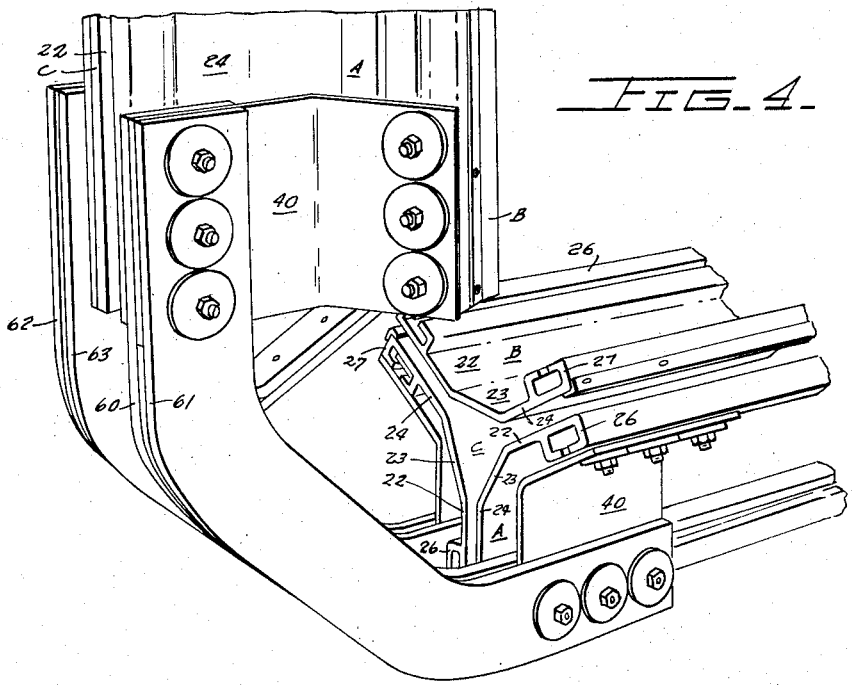
FIG. 4.
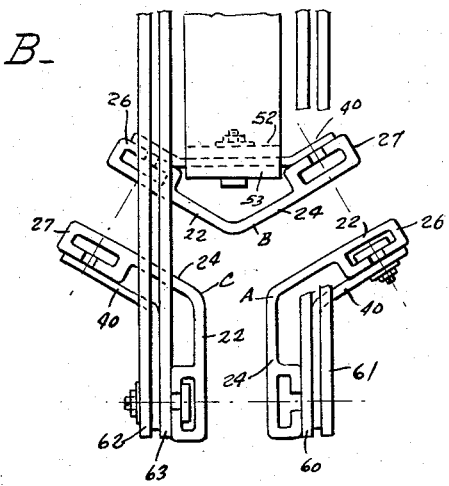
FIG. 4B.
FIG. 4A.
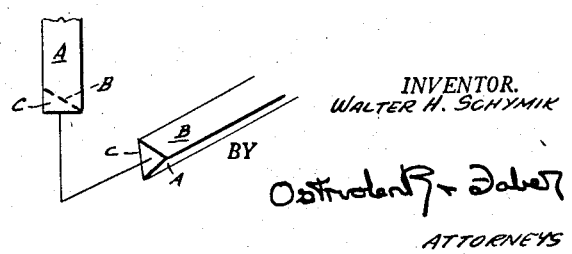
INVENTOR.
WALTER H. SCHYMIK
BY
Ostrolenk & Faber
ATTORNEYS

INVENTOR.
WALTER H. SCHYMIK
BY
ATTORNEYS

March 10, 1959 W. H. SCHYMIK 2,877,289
ENCLOSED BUS SECTOR
Filed Jan. 13, 1953 6 Sheets-Sheet 5
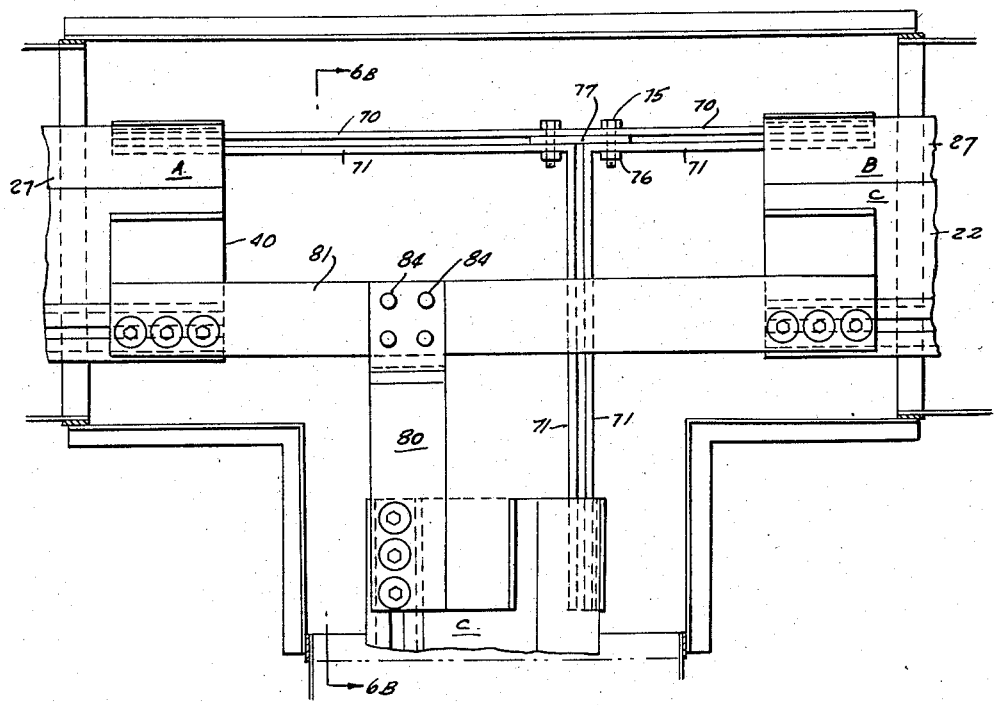
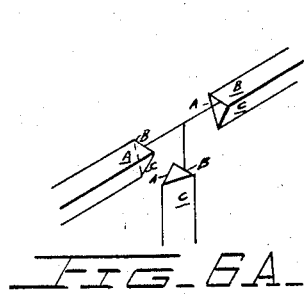
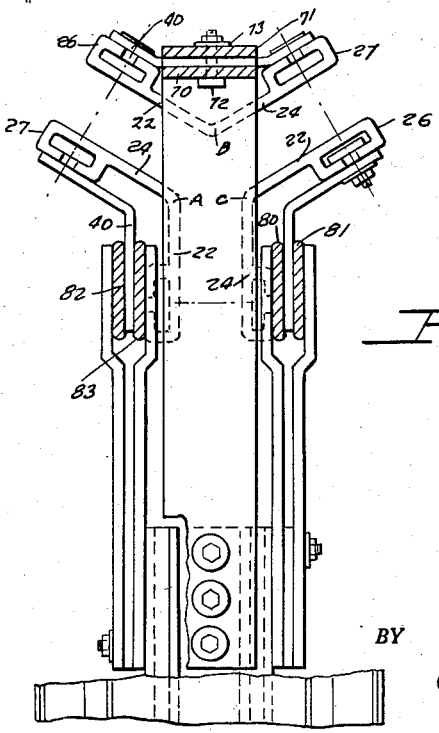
INVENTOR.
WALTER H. SCHYMIK
BY
ATTORNEYS March 10, 1959  W. H. SCHYMIK  2,877,289
ENCLOSED BUS SECTOR
Filed Jan. 13, 1953  6 Sheets-Sheet 6
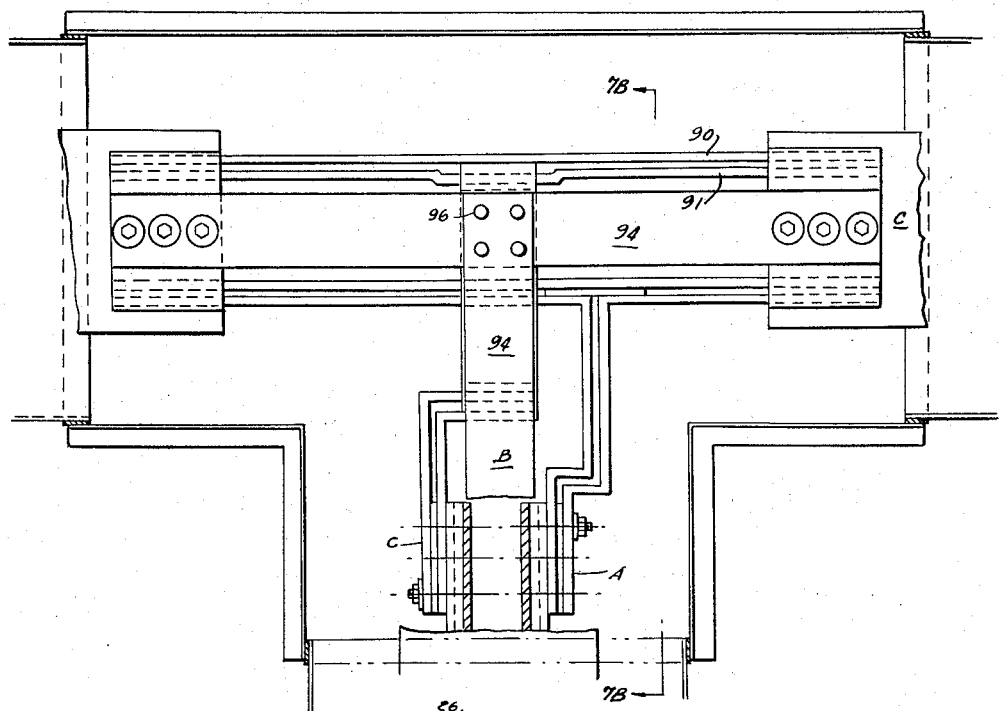
Fig. 7
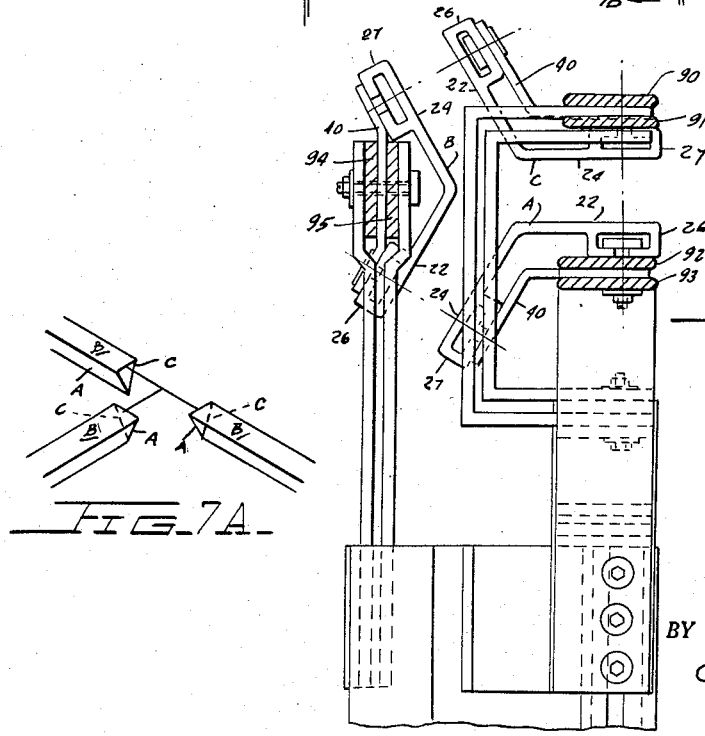
Fig. 7A
Fig. 7B
INVENTOR.
WALTER H. SCHYMIK
BY
Ostrolenk & Faber
ATTORNEYS

United States Patent Office 2,877,289
Patented Mar. 10, 1959

2,877,289

ENCLOSED BUS SECTOR

Walter H. Schymik, Oreland, Pa., assignor to I-T-E Circuit Breaker Company, Philadelphia, Pa.

Application January 13, 1953, Serial No. 330,941

13 Claims. (Cl. 174—99)

My invention relates to an enclosed sector bus arrangement and is more particularly directed to a novel bus run arrangement for elbow and T-type arrangements in which each connecting extension member lies in one plane.

In a design of a bus run and enclosure therefor, it is desirable to provide a dust-tight and water-tight enclosure to protect the system when it is either installed outdoors or in a hazardous area containing dust, steam, gases, etc.

A novel enclosure unit to achieve the above, which may be used with the bus run of my present invention, is disclosed in my copending application Serial No. 330,875, filed January 12, 1953.

In addition to the requirement that the bus enclosure be pressure-, dust-, and water-tight, it is also desirable to provide a structural arrangement which permits free movement of the conductors, or buses. That is, undue expansion due to either normal load overheating or resulting from a short circuit condition will result in expansion of the bus run and it is necessary to provide compensating means to prevent buckling thereof.

In addition to the above mentioned desirable features required for a bus run, it will be further noted that it is advantageous to place the bus insulating supports under a compressive stress resulting from the magnetic forces created by a short circuit condition in the bus run. That is, since the ceramic support insulators are capable of withstanding a much higher compressive stress than tension stress, it is desirable that these units be subjected to the former stress on the occurrence of a short circuit condition.

In the installation of bus runs, it is frequently necessary that the bus structure be constructed with a plurality of elbow or T connections. In the prior art arrangement, the extension connecting members between the various arms of a T or elbow connection to complete the electrical circuit therebetween presented a difficult structural problem. For example, in a three phase bus line in which the bus of each phase is in a different plane, it was necessary to provide complex connecting members to complete the T or the elbow.

These extension connecting members must be provided with a twist and bend in order to complete the electrical circuit between a bus line in a first plane and a bus line in a second plane. This arrangement not only resulted in expensive components for the installation in that each extension member had to be separately manufactured for the particular arrangement, but also substantially reduced the mechanical strength of the bus run due to the required twist of the extension member.

In the novel sector bus of my invention, I have provided an arrangement wherein:

(a) The forces resulting from a short circuit are such as to apply a compressive stress on the supporting insulators;

(b) Each phase of the bus run is independently mounted and supported so that undue heating or expansion of any one of the buses will be confined to that unit and will not affect the remaining buses;

(c) It is possible to achieve elbow and T connections for a bus run, and wherein the extensions will lie in a single plane, either horizontal or vertical, thereby eliminating any twist or undue configuration thereof.

In my novel arrangement, the three phase bus structure is mounted in a common enclosure. Each conductor is mounted and supported, within a single section, by four insulators. The conductor is fixed or anchored to two insulators which are positioned at one end thereof and is slidably mounted on the second set of insulators which are positioned at the opposite end thereof.

This arrangement provides for proper compensation and expansion of the bus run to prevent buckling thereof when it is subjected to excess heat. The insulators or bus supports are mounted on a bracket member which is welded or fixed to the bus enclosure.

Since the three buses are independently and individually mounted and supported, the movement due to expansion of any one bus or conductor will not affect the remaining two buses or conductors.

Furthermore, the arrangement of the bus support, positioned on the outer periphery of the bus run structure, is such that the forces resulting from short circuit conditions will result in forces which place the insulators under a compressive force.

Each set of three phase sector buses are mounted in a self-contained enclosed section with the conductors extending from each end thereof. The space which exists between adjacent fixed enclosed sections may be covered with either a split enclosure, a slidable enclosure, or a telescopic enclosure, as set forth in my co-pending application Serial No. 330,875, filed January 12, 1953.

The conductor used in my novel sector bus is an integral member with three sections thereof lying in different planes. The two outer sections of the conductor are provided with a C-shaped extension which serves the dual purpose of enabling the bus to be connected and supported to the insulators and permits connection of the extension members which are to be used to complete the connection for an elbow or T-shaped arrangement.

With this novel design of the conductor and C-bracket extension, it is possible to connect the extension members between the bus runs in the arms of an elbow or T so that the extension members will lie in a single plane and/or will not require a twist to complete the connection.

Accordingly, a primary object of my invention is to provide a novel enclosed sector bus which is readily and easily adaptable for elbow and T-connections.

Another object of my invention is to provide a novel arrangement wherein three phase conductors can be mounted individually and independently in a single housing.

A further object of my invention is to provide a novel conductor arrangement wherein the extension units completing the extension between buses and the various arms of an elbow or T connection can lie in a single plane, thereby eliminating the necessity of twisting or distorting the extension member.

Still another object of my invention is to provide a novel bus arrangement wherein the supporting insulators will be placed under a compressive stress due to the magnetic forces set up by a short circuit condition.

A still further object of my invention is to provide independent and separate mountings for the conductors of a three phase sector bus so that the heat and/or expansion of one conductor will be confined thereto and will not affect the remaining units.

These and other objects of my invention will be apparent from the following description when taken in connection with the drawings in which:

Figure 1 is a cross-sectional view of my novel three phase sector bus taken along the line 1—1 of Figure 2. This figure shows the novel configuration of the integral bus having the three units thereof lying in different planes with the C-shaped extensions at the outer edges thereof. The cross-sectional view also illustrates the separate and independent mounting of the conductors of the three phase bus run wherein the supporting insulators are positioned in the outer periphery of the conductors so that they will be placed in compression due to the magnetic force set up under a short circuit condition.

Figure 4 is a perspective view of the sector bus with the housing and insulating supports removed showing the connection for a 90° vertical solid connection. This figure shows the extension connections between the buses A—A and C—C lying in a vertical plane. The connection between the buses B—B are not shown.

Figure 4A is a schematic view showing the position of the sector buses for the connection of Figure 4.

Figure 4B is a side elevation view illustrating the connection of the extension member for a second configuration of the sector bus.

Figure 5:
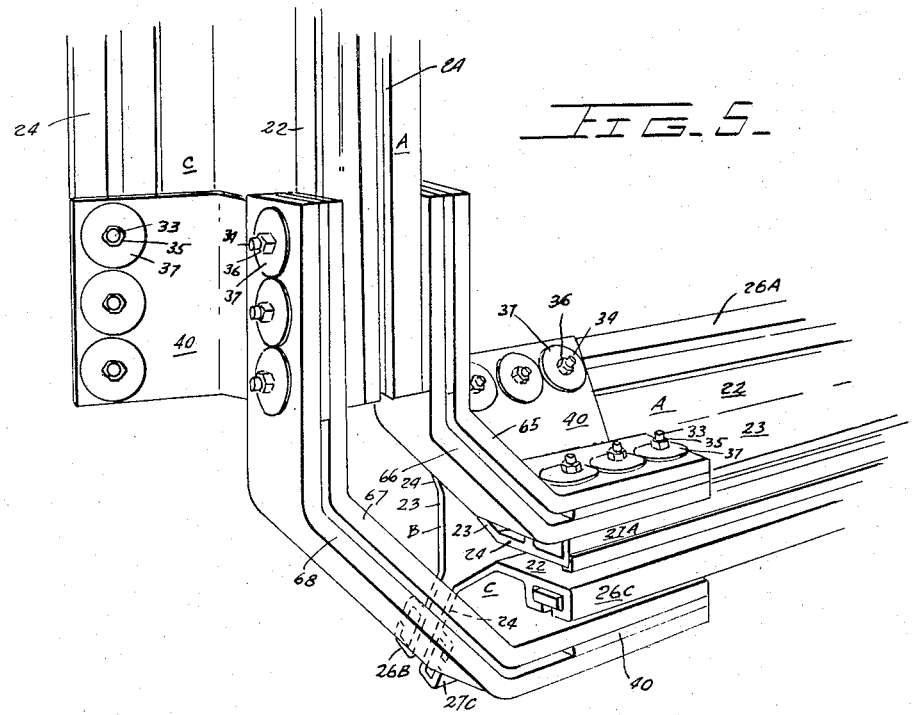

Figure 5 is a perspective view, with the housing and insulating supports removed, of the bus run showing a vertical 90° solid connection.

Figure 5B:
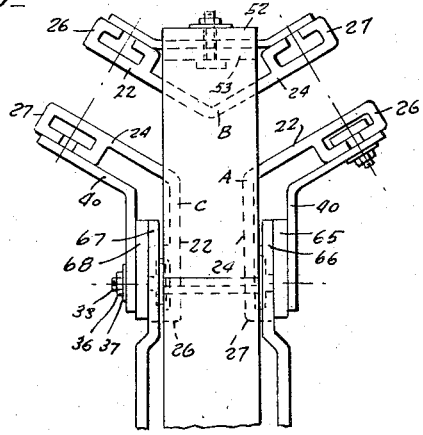
Figure 5A:
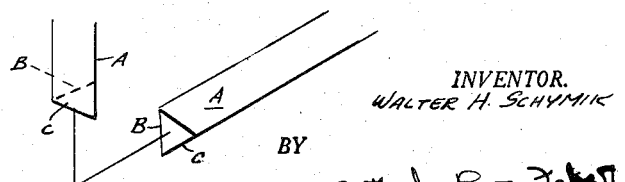

Figure 5A is a schematic representation of the position of the sector buses with the connection of Figure 5.

Figure 5B is a side elevation view illustrating the connection of the extension member for a second configuration of the sector bus.

Figure 6 is a plan view showing a vertical T connection for my novel sector bus arrangement.

Figure 6A is a schematic view showing the position of the sector buses for the connection shown in Figure 6.

Figure 6B is a view taken in the direction of the arrows 6B—6B of Figure 6.

Figure 7 is a plan view illustrating a horizontal T connection for my novel sector bus.

Figure 7A is a schematic view showing the position of the sector buses for the connection of Figure 7.

Figure 7B is a section elevation taken in the direction of the arrows 7B—7B of Figure 7.

Figure 1:
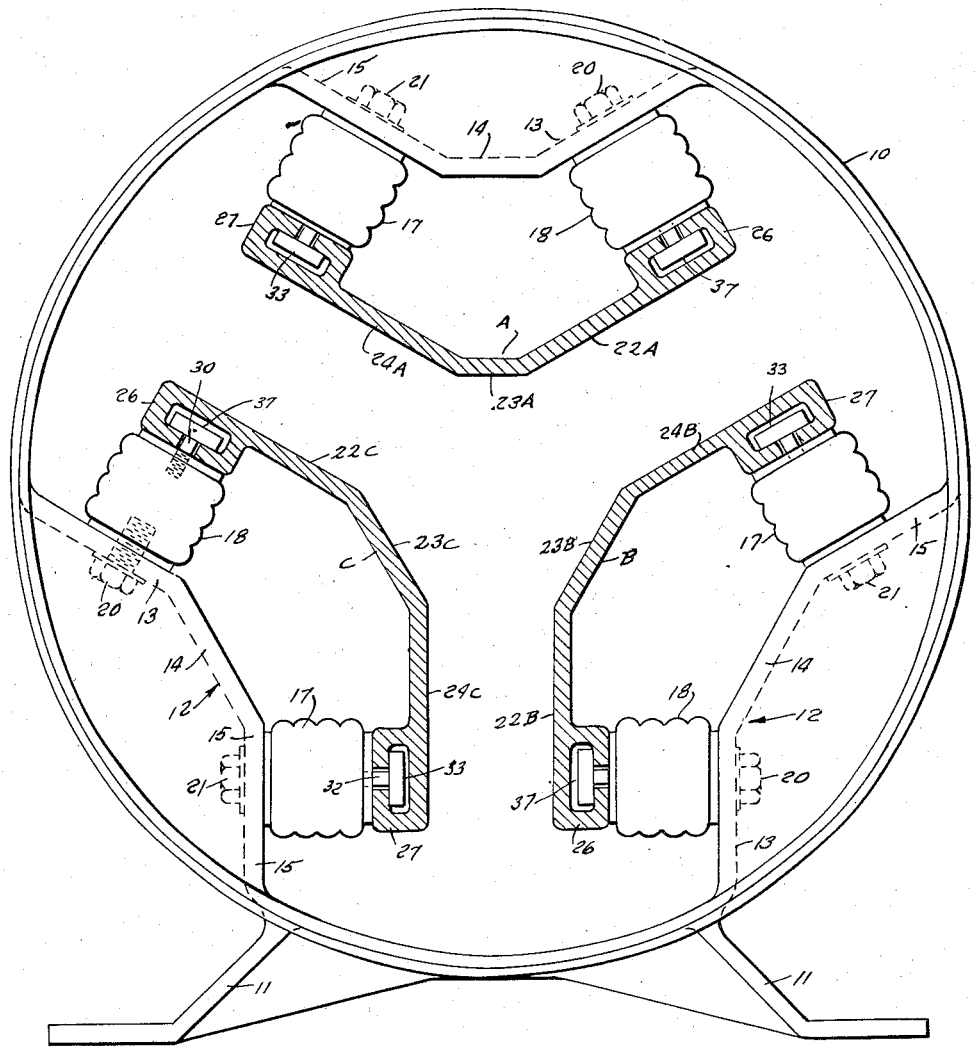

Referring now to Figure 1, a bus housing 10 is supported by appropriate brackets 11 in any well known manner. The housing 10 is preferably a solid 360° welded unit positioned along the bus run as shown in Figure 2.

Figure 2:
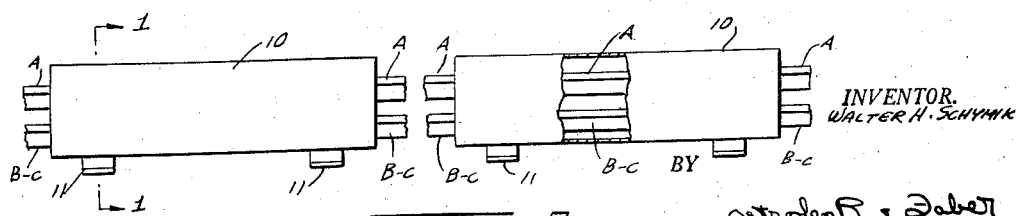
Figure 2 is a perspective cut-away view of the housing sections for my novel sector bus arrangement.

It will be noted that the brackets 11 are positioned in close proximity to the ends of each housing section 10, as seen in Figure 2. The plurality of insulator supports 18 are positioned in the area adjacent these support brackets and thus, Figure 1 is a representation of the cross-sectional area existing at any one of the various brackets 11, seen in Figure 2.

Three brackets 12 are positioned 120° apart around the inside periphery of the housing 10 and secured thereto in any desirable manner. The bracket 12 consists of three sections 13, 14 and 15 which lie in different planes. Each section of the bracket 12 lies in a plane parallel to a corresponding section in the bus conductors A, B and C, as will hereinafter be more fully described.

Insulators 17 and 18, made of ceramic or any other desirable insulating material, are permanently secured to the legs 13 and 15 of the bracket 12 by means of bolts 20 and 21. The conductors A, B and C are constructed with three sections 22, 23 and 24 which all lie in different planes. C-shaped brackets 26 and 27 protrude from the extensions 22 and 24 and extend the entire length of the conductor. Holes are provided in the back of C-shaped brackets 26 and 27 for access to head of bolts 33—37.

The heads 31 and 33 of the screws 30 and 32 are positioned within the opening of the C-shaped bracket 26 and 27. The screws 30 and 32 are threadably secured to the insulators 17 and 18 to thereby provide a support for the conductor.

The cross-sectional view of Figure 1 illustrates the connections which exist at the right and left-hand end of the section 10, as seen in Figure 2. At the right-hand end the screws 30 and 32 will permanently secure the conductors A, B and C to their support insulators 17 and 18. However, at the left end the screws 30 and 32 will merely be loosely mounted within the opening of the C-bracket extensions 26 and 27 to thereby permit slidable engagement between the conductors A, B and C and their insulators 17 and 18.

Thus, it will be seen that with this arrangement whereby the conductors are permanently secured at one end and slidably mounted at the opposite end, adequate compensation is provided for the expansion resulting from excess heat.

Furthermore, by placing the insulators 17 and 18 on a periphery which surrounds the conductors A, B and C, the magnetic forces set up will place these insulators in compression. It will also be noted that by providing independent brackets 12 for each of the conductors A, B and C so that these units are not structurally interconnected or related, undue heating or expansion of one conductor will not affect the remaining conductors.

Thus, as best seen in Figure 1, the conductors A, B and C which are provided with sections 22, 23 and 24 lying in different planes will form a triangle with the planes containing the sections 23A, 23B and 23C and the pair of remaining legs will be parallel to each other. That is, the leg of 22C will be parallel to the leg 24A, the leg 24C will be parallel to the leg 22B and the leg 24B will be parallel to the leg 22A.

As heretofore noted, each leg of the conductor will not only be parallel to its corresponding opposite leg of the adjacent conductor but will also be parallel to one leg of the support bracket 12. Thus, for example, the legs 22 of the conductors will be parallel to leg 13 of the support bracket 12 and the legs 24 will be parallel to the leg 15 of their corresponding support bracket 12.

Although the connection between the conductors associated with the conductors of adjacent housing sections will present no difficulty when the housing sections are in alignment, as seen in Figure 2, considerable difficulty has heretofore been encountered when it has been necessary to connect the conductors of adjacent housing sections when these sections were at right angles. That is, due to the configuration and relationship of the conductors of various arms in an elbow or T-shaped connection, it was frequently necessary to provide special connectors which had unusual twists and/or bends therein to complete the electrical circuit.

My invention is related to a novel arrangement wherein the connectors between conductors in various arms of T and elbow connections will either lie in a single plane or be of a relatively simple bent construction.

The various configurations and types of connections to be used for horizontal elbows, vertical elbows, vertical T connections and horizontal T connections are shown in Figures 3, 4, 5, 6 and 7.

Figure 3:
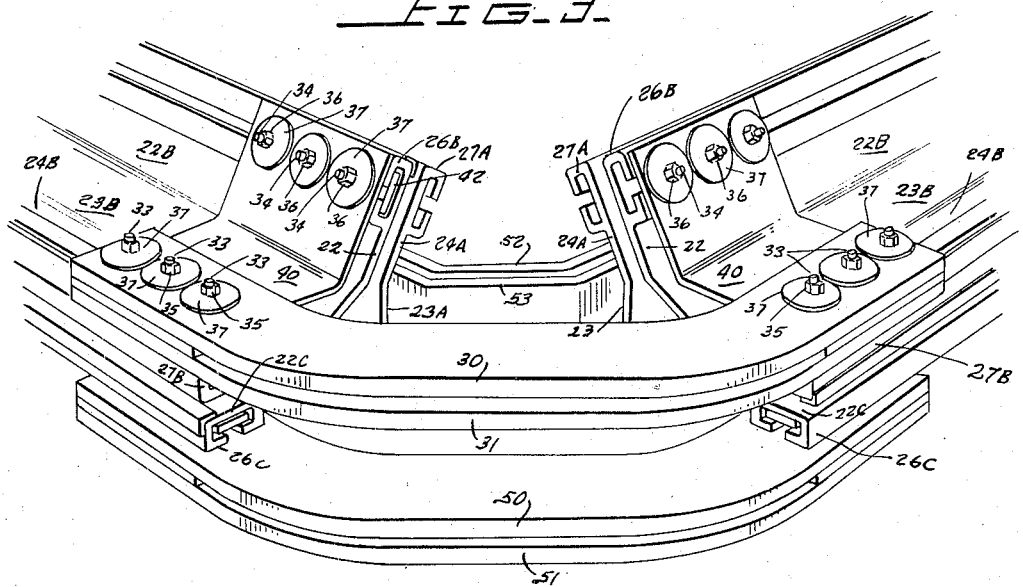
Figure 3 is a perspective view showing the configuration and connection of the extension members joining adjacent bus bars for a horizontal 90° solid connection. This figure shows the extension between the bus conductors B—B and C—C lying in a horizontal plane and the extension connections between the bus conductors A—A lying in a vertical plane.
Figure 3B:
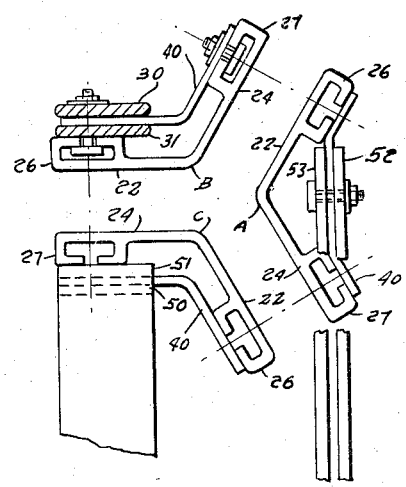
Figure 3B is a side elevation view illustrating the connection of the extension member for a second configuration of the sector bus.
Figure 3A:
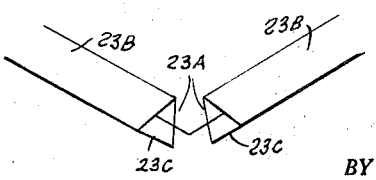
Figure 3A is a schematic illustration showing the position of the sector buses for the connection shown in Figure 3.

Thus, for example, when the conductors A, B and C of the two arms of an elbow lie in a single plane, and are in the relationship indicated in the schematic view illustration of Figure 3A, the connections between associated bus bars will be as seen in Figure 3.

As heretofore noted, the planes containing the arms 23 of the conductors forms a triangle and the schematic illustration of Figure 3A illustrates the relationship of only the arms 23 of the various conductors in the various lengths.

Thus, it will be seen in Figure 3 with the configuration of the conductors as noted, some of the legs of some of the corresponding conductors will lie in a single plane. Accordingly, if it is desired to make an electrical connection between the conductor B existing in the right and left hand arm of the elbow, an unusual configuration of the connecting members would be required for the connector extending between corresponding arms 22. That is, since these arms neither lie in one plane nor are perpendicular to each other, it would be necessary to provide a twist or unusual configuration of the connector extension in order to connect the conductor B of the right and left hand arms from the extension 32.

However, since the legs or extensions 24 of the conductors B lie in a single plane, it will be possible to have the connecting extensions exist therebetween and thus, have these extension units lie in a single plane.

Thus, for example, connecting extensions 30—31 which connect arms 24 of the conductors B lie in a single plane. This connection is as follows. The elbow bend extension 31, which lies in a single plane, is positioned at the top of the C-bracket extensions 27 and is provided with a plurality of openings to receive the conducting screws 33. A V-bracket 40 having a plurality of openings at each end which register with the longitudinal slot of the C-bracket extension 27 and 26 is placed over the connecting extension 31 and the C-bracket extension 27.

The connecting extension 30, which has a plurality of openings at the ends thereof, corresponding to the openings in the connector extension 31 is then positioned on top of the V-brackets 40. The heads of the screws 33 and 34 thereby pass through the appropriate openings in the bracket 40 and the connecting extensions 30 and 31. It will be noted that the head 42 of the screws 33 and 34 is positioned within the C-opening of the C-brackets 26 and 27. The conducting washers 37 are then placed over the threaded ends of the conducting screws 33 and 34 and the nuts 35 and 36 are threadably engaged with the extensions to insure that the bracket 40 and the extensions 30 and 31 are securely fastened to the conductors B.

Thus, it will be noted that a large cross-sectional area is obtained by using two conducting extension members 30 and 31 so that the resistive path in the connecting extensions is substantially the same as in the conductors B.

Furthermore, the brackets 40 are conducting members so that current can flow from the conductors B through both of their extension legs 22 and 24, through C-brackets 26 and 27 to the V-bracket plates 40 and the connector extensions 30 and 31. Hence, at no point in the conductors will there be any undue concentration of current. That is, by providing strap V-brackets 40 between the C-brackets 26 and 27, it is possible to eliminate any undue current density concentration within the conductors.

With regard to the conductors C in each arm of the horizontal bracket, it will be noted that the legs or arms 22 will lie in the same plane and hence, the connection therebetween can be made in substantially the same manner as set forth above in the description of the connection between the legs 24 and the conductors B.

That is, the connector extensions 50 and 51 will extend between the legs 22 of the conductors C in each leg of the horizontal elbow and, as seen in Figure 3, will lie in one plane. Furthermore, since the legs or extensions 22 of conductors C will be parallel to the legs or extensions 24 of the conductor B, as above noted, the connector extensions 50 and 51 will be parallel to the connector extensions 30 and 31.

With regard to the connection between the conductors A in each leg of the horizontal elbow, a bracket having substantially the same shape as the sector bus A is secured thereto in substantially the same manner as set forth with V-brackets 40 connected to the sector bus B.

The bracket, which extends between the C-brackets 26 and 27 of the conductor A, will have the conductor extensions 52 and 53 secured to the center leg thereof. That is, the connector extensions 52—53 will be secured to the leg of the bracket which is parallel to the leg 23 of the conductor A. Since the legs 23 of the sector bus A in the horizontal elbow are perpendicular to each other, it will be necessary for the connector extensions 52—53 to complete this perpendicular path, and as clearly seen in Figure 3, may be bent in any appropriate manner.

It will be noted that the connection arrangement illustrated for the horizontal elbow, as shown in Figure 3A, will be achieved in the manner shown in Figure 3 when the sector buses have a configuration containing three legs in each plane.

However, if the sector buses have a V-shaped arrangement, the novel connection means can still be achieved without the necessity of having a twist therein. Thus, as shown in Figure 3B, wherein the connections for a V-shaped sector bus are illustrated, it will be apparent that the connector extensions 30—31, 50—51, and 52—53 between the sector buses A, B and C respectively, can be made in substantially the same manner as set forth in connection with Figure 3.

The arrangement of the connector extensions between associated bus bars which are in legs of a vertical elbow, as schematically illustrated in Figure 4A, is shown in the perspective view of Figure 4. With this arrangement, the legs 24 of the conductors A will lie in a single plane and hence, the connector extensions 60—61 will extend between these two legs and lie in a single plane.

The construction and connection is substantially as set forth for the connector extensions 30—31 of Figure 3 which extend between the arms 24 of the sector bus B.

In like manner, the connector extensions 62—63, lying in one plane, will extend between the arms 22 of the sector bus C in substantially the same manner as the connector extensions 50—51 will lie between and connect the legs 22 of the sector bus C in Figure 3.

With regard to the connection between the sector buses B, it will be noted that the center legs 23 will be perpendicular to each other in substantially the same way that the legs 23 of the sector bus A are perpendicular to each other in Figure 3. Thus, although the connector extensions which will connect between the legs 23 of the conductors B are eliminated from Figure 4 for the sake of clarity, it will be noted that the connections therebetween are substantially the same as the connections between the sector buses A, shown in Figure 3. As heretofore noted, the sector buses A, B and C can have a V shaped cross-sectional area instead of the three leg configuration shown in Figures 1, 3 and 4. However, even though the configuration of the bus bars are V-shaped, the connector extensions between associated conductors will be made in the same manner as set forth in Figure 4.

The cross-sectional view of Figure 4B illustrates the connection of the connecting extensions to the sector buses A, B and C indicating that the purpose and arrangement is the same for a V-shaped bus bar as for a three section bus bar.

Figure 5 illustrates the connection between associated sector buses when same are positioned in a vertical elbow. In this arrangement, it will be noted that the legs 24 of the sector buses A and the legs 22 of the sector buses C will be perpendicular to each other and hence, the connection therebetween can be made by the connecting members 65—66 and 67—68, respectively.

Thus, it will be noted that the connection between the perpendicular legs 24 of conductor A and perpendicular legs 22 of conductor C is made in substantially the same manner as the connection between the perpendicular legs 23 of conductor A, as seen in Figure 3.

Accordingly, it will be apparent that with my novel construction, there will be at least one set of legs or extensions of corresponding sector buses which either lie in a single plane or are perpendicular to each other. In the event the two units lie in a single plane, then the connection will be made as noted with connector extensions 30—31 and 50—51 of Figure 3 and 60—61 and 62—63 of Figure 4. In the event the legs or extensions of the corresponding sector bus are perpendicular, the connections therebetween may be made as noted for the connector extensions 52—53 of Figure 4 of 65—66 and 67—68 of Figure 5.

Accordingly, it will be apparent that since the legs 23 of sector buses B in Figure 5 lie in a single plane, the connection therebetween will be similar to that set forth for the connection between legs 24 of sector bus B or legs 22 of sector bus C, in Figure 3, and legs 24 of sector bus A and legs 22 of sector bus C of Figure 4.

In view of the fact that the connection between the legs for the sector bus C of Figure 5 is similar to that shown as above noted in Figures 3 and 4, it is eliminated from Figure 5 for the sake of clarity.

As heretofore noted, when a V-shaped bus bar is used instead of a three segment bus bar, as shown in Figures 1 and 5, the connecting extensions are secured and extend from the legs of the conductors A, B and C in substantially the same manner as set forth in Figure 5. Thus, in the side elevation view of Figure 5B, it will be seen that the connector extensions 52—53, 65—66 and 67—68 are secured and extend from the legs of the V-shaped conductors in substantially the same way that these connector extensions are secured and extend from the legs of the three element conductors of Figure 5.

It will be noted that with the connector arrangement shown in Figures 3, 4 and 5, that the extension bracket 40 is sandwiched between the connector extension units. For example, the extension bracket 40 is positioned between the connectors 30—31, 50—51 and 52—53 in Figure 3. However, it will be noted that this arrangement can be altered or modified to any particular situation so that the connector extensions are positioned side by side with the extension bracket on one side thereof, for example, as seen in Figure 5B.

The method for joining the conductors for a vertical T connection or for a horizontal T connection is shown in the series Figures 6 and 7.

Figure 6A is a schematic representation of the position of the conductors A, B and C in each leg of the T for a vertical T connection. The detailed representation of the connector extensions between the various conductors in the three arms of the T is shown in the Figures 6 and 6A.

For the purpose of illustration, it is assumed that each sector bus has a V-shaped cross-section substantially as shown in Figures 3B, 4B and 5B. In this arrangement, the bracket extensions 26—27 for the conductor B has three sections, with the center section lying in a horizontal plane. Hence, the connector extensions 70—71, attached to the center leg thereof by means of bolt, nut and washer 72—73—74 will lie in a horizontal plane.

A similar bracket extension is secured to the sector bus B which is in the vertical leg of the T arrangement. Hence, as best seen in Figure 6, the connecting extensions 70—71 from the vertical conductor B will be perpendicular to the connector extension 71 extending from conductors B which are in the horizontal arm of the T and hence, the connection therebetween can be made without the necessity of a bend or a twist in the connectors.

In a preferred embodiment shown in Figure 6, the connector extension between the bus B in the vertical arm and the bus B in the right arm is an integral L-shaped member and the connection between the same bus B in the vertical arm and the bus B in the left horizontal arm is also an integral L-shaped member. As noted in Figure 6, the connector extensions may be secured together by conducting nut and bolt arrangement 75—76 with a conducting spacer 77 positioned therebetween.

With regard to the connection between the sector bus C and the three arms of the T, connecting extensions 80—81 extend from the leg 24 and hence, lie in a vertical plane. It will be noted that the extensions 80—81 are mechanically and electrically secured to the sector bus C by means of the bracket 40 in substantially the same manner as heretofore set forth for the other connector extensions.

As noted, the connector extensions from all arms of the T will lie in the same vertical plane and the connectors 80—81 between the right and left hand horizontal arm of the T will run in a horizontal direction whereas the extension from the conductor B in the vertical arm of the T will run in a vertical direction. Accordingly, these two units can be connected in the T arrangement, as seen in Figure 6, by means of nuts and bolts 84.

It will be noted that since the plurality of sector buses A of the three arms of the T are positioned in the same relationship as the three sector buses C, the connection therebetween will be as heretofore described in connection with sector bus C. That is, the connection between the connector extensions 82—83 between the conductors A will be the same as set forth for the connection of the connector extensions 80—81 of the bus C.

The schematic representation of Figure 7A illustrates the position of the sector buses in a horizontal T connection and Figure 7 and 7B illustrates the inner connection of the connector extensions between the sector buses in each arm of the horizontal T.

Although the relationship of the arms of the conductors in the various arms of the T are different from that set forth in Figures 6, 6A, and 6B, it will be noted from the illustration of Figure 7B that connector extensions 90—91, 92—93, and 94—95 can be secured respectively, to the conductors C, A, and B so that they either fall in a horizontal or vertical plane. Hence, it will be apparent that since all of the connector extensions from any one set of sector buses will lie in a single plane, a T connection can be made therebetween, as seen in the plane view of Figure 7, by means of screws 96. Thus, it will be apparent that since all of the connector extensions can be made to lie in a single plane, the connector extensions can be made without having a twist therein.

Accordingly, I have provided a novel bus run arrangement wherein the sector buses are positioned concentrically within the plurality of supporting insulators. That is, the sector buses and the supporting insulators are grouped around a common center with the sector buses being located closer to the center than are the supporting insulators. With this configuration a compressive stress is placed on the insulators from the magnetic force set up by the short circuit current.

Furthermore, the sector buses are so constructed, made and mounted that they are independent units enabling expansion or heating of any one conductor to be confined to that one conductor and not effect the remaining buses or conductors.

In addition to the above, my novel arrangement makes possible a relatively simple connection between elbow and T connections for a bus run, thereby eliminating any twist or necessity for any type of configuration of the connecting units.

In the foregoing, I have described my invention only in connection with preferred embodiments thereof. Many variations and modifications of the principles of my invention within the scope of the description herein are obvious. Accordingly, I prefer to be bound not by the specific disclosure herein but only by the appending claims.

I claim:

1. In a polyphase bus run assembly comprising a plurality of polyphase sector buses, support insulators individual to said buses, an insulator support bracket individual to each of said buses, and a housing, said sector buses, support insulators and insulator support brackets being positioned at spaced locations within said housing, each of said locations having a plurality of insulator support brackets angularly positioned around the interior of said housing, means for permanently securing said insulator support brackets to said housing, means for mounting at least two insulators on each of said insulator support brackets, means including said buses for mounting said sector buses on their individual insulator support brackets through their individual insulators, the insulators for each bus being in axial alignment with insulators of adjacent buses to place said insulators under compression in response to forces set up by currents flowing in said buses, means for rigidly securing said sector buses to said insulators at alternate locations, said sector buses being slidably secured to said insulators at the remaining alternate locations, said rigid engagement and said slidable engagement between said conductors and said insulators permitting the expansion of any one of said sector buses to be confined thereto without affecting the remaining sector buses, said insulators being positioned concentrically between said sector buses and said housing, said insulators having a substantially exclusively compressive stress applied thereto by magnetic forces accompanying currents in said bus run assembly when said sector buses are subjected to short circuit conditions.

2. In a polyphase bus run assembly comprising a plurality of polyphase sector buses each having a first and second leg, support insulators individual to said buses, an insulator support bracket individual to each of said buses, and a housing, said sector buses, support insulators and insulator support brackets being positioned at spaced locations within said housing, each of said locations having a plurality of said insulator support brackets angularly positioned around the interior of said housing, means for permanently securing said insulator support brackets to said housing, means for mounting at least two insulators on each of said insulator support brackets, means including said buses for mounting said sector buses on their individual insulator support brackets through their individual insulators, the insulators for each bus being in axial alignment with insulators of adjacent buses to place said insulators under compression in response to forces set up by currents flowing in said buses, a first sector bus associated with each of said insulator support brackets at each of said locations, means for rigidly securing said sector buses to said insulators at predetermined locations, said sector buses being slidably secured to said insulators at the other predetermined locations, said rigid engagement and said slidable engagement between said conductors and said insulators permitting the expansion of any one of said sector buses to be confined thereto without affecting the remaining sector buses, said first and second legs of said sector buses having a C-bracket extension extending therefrom, and comprising said rigid securing means, a connector means to secure said sector buses to said insulators, said C-bracket extension extending the entire length of said sector buses, said C-bracket extensions encompassing a portion of said connector means.

3. In a polyphase bus run assembly comprising a plurality of polyphase sector buses each having a first and second leg, support insulators individual to said buses, an insulator support bracket individual to each of said buses, and a housing, said sector buses, support insulators and insulator support brackets being positioned at spaced locations within said housing, each of said locations having support brackets angularly positioned around the interior of said housing, means for permanently securing said insulator support brackets to said housing, means for mounting at least two insulators on each of said insulator support brackets, said insulator support brackets comprising an integral unit having a first and second leg, each of said sector buses comprising a unit having a first and second leg, means including said buses for mounting said sector buses on their individual insulator support brackets through their individual insulators, the insulators for each bus being in axial alignment with insulators of adjacent buses to place said insulators under compression in response to forces set up by currents flowing in said buses, means for rigidly securing said sector buses to said insulators at predetermined locations, said sector buses being slidably secured to said insulators at the other predetermined locations, said rigid engagement and said slidable engagement between said conductors and said insulators permitting the expansion of any one of said sector buses to be confined thereto without affecting the remaining sector buses, said first and second legs of said sector buses having a C-bracket extension extending therefrom, and comprising said rigid securing means, connector means to secure said sector buses to said insulators, said C-bracket extension extending the entire length of said sector buses, said C-bracket extension encompassing a portion of said connector means, said connector means comprising a screw with the head thereof encompassed by said C-bracket, said screw enabling said sector bus to be in slidable engagement with said insulators at said other predetermined locations.

4. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit including a first and second leg having C-bracket extensions thereon, said sector buses being mounted and supported on said insulator support brackets by said insulators, said first sector bus being individual to said first insulator support bracket, said second sector bus being individual to said second insulator support bracket, said third sector bus being individual to said third insulator support bracket, a first, second and third connector extension between said first, second and third sector buses, respectively, in adjacent sections, said first connector extension extending from said leg of said first sector bus and lying in the same plane as said first legs, said second connector extension extending from said second leg of said second sector bus and lying in the same plane as said second legs, a bracket extending between said C-bracket extensions of said third sector bus, said bracket comprising an integral member having three legs, one leg of said bracket associated with said third sector bus in a first section perpendicular to one leg of said bracket associated with said third sector bus of an adjacent section, said third connector extension secured at each end to said one leg of each of said brackets to complete said ninety degree bend.

5. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit including a first and second leg having C-bracket extensions thereon, said sector buses being mounted and supported on said insulator support brackets by said insulators, said first sector bus being individual to said first insulator support bracket, said second sector bus being individual to said second insulator support bracket, said third sector bus being individual to said third insulator support bracket, a first, second and third connector extension between said first, second and third sector buses, respectively, in adjacent sections, said first connector extension extending from said leg of said first sector bus and lying in the same plane as said first legs, said second connector extension extending from said second leg of said second sector bus and lying in the same plane as said second legs, a bracket extending between said C-bracket extensions of said third sector bus, said bracket comprising an integral member having three legs, one leg of said bracket associated with said third sector bus in a first section perpendicular to one leg of said bracket associated with said third sector bus of an adjacent section, said third connector extension secured at each end to said one leg of each of said brackets to complete said ninety degree bend, said first, second and third connector extensions permitting connection between sector buses in each arm of a vertical elbow without having a twist in said connector extensions.

6. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit including a first and second leg having C-bracket extensions thereon, said sector buses being mounted and supported on said insulator support brackets by said insulators, said first sector bus being individual to said first insulator support bracket, said second sector bus being individual to said second insulator support bracket, said third sector bus being individual to said third insulator support bracket, a first, second and third connector extension between said first, second and third sector buses, respectively, in adjacent sections, said first connector extension extending from said leg of said first sector bus and lying in the same plane as said first legs, said second connector extension extending from said second leg of said second sector bus and lying in the same plane as said second legs, a bracket extending between said C-bracket extensions of said third sector bus, said bracket comprising an integral member having three legs, one leg of said bracket associated with said third sector bus in a first section perpendicular to one leg of said bracket associated with said third sector bus of an adjacent section, said third connector extension secured at each end to said one leg of each of said brackets to complete said ninety degree bend, said connector extensions permitting electrical and physical attachment between associated sector buses in the arms of a horizontal elbow connection without the necessity of having a twist in said connector extensions.

7. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support brackets, said third sector bus associated with said third insulator support bracket, a first, second and third sector bus section comprising a horizontal T connection, a first, second and third connector extension for connecting said first, second and third sector buses of said first, second and third sections, respectively, said first and second connector extensions lying in a horizontal plane, said third connector extension lying in a vertical plane.

8. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support brackets, said third sector bus associated with said third insulator support bracket, a first, second and third sector bus section comprising a horizontal T connection, a first, second and third connector extension for connecting said first, second and third sector buses of said first, second and third sections, respectively, said first and second connector extensions lying in a horizontal plane, said third connector extension lying in a vertical plane, said first and second connector extensions being parallel to one leg of said sector buses to which it is connected.

9. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support bracket, said third sector bus associated with said third insulator support bracket, a first, second and third sector bus section comprising a horizontal T connection, a first, second and third connector extension for connecting said first, second and third sector buses of said first, second and third sections, respectively, said first and second connector extensions lying in a horizontal plane, said third connector extension lying in a vertical plane, said first and second connector extensions being parallel to one leg of said sector buses to which it is connected, said third connector extension being at an angle to said first and second leg of said third sector bus.

10. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support brackets, said third sector bus associated with said third insulator support bracket, a first, second and third sector bus section forming a vertical T connection, connector extensions interconnecting said first, second and third sector buses of said first, second and third sector bus sections, respectively, said first connector extension for said first sector bus of said first and second section lying in one plane at an angle to the arms of said last mentioned sector bus, said first extension for said first sector bus of said third section lying in one plane and being perpendicular to said first connector extension for said first and second sections.

11. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support bracket, said third sector bus associated with said third insulator support bracket, a first, second and third sector bus section forming a vertical T connection, connector extensions interconnecting said first, second and third sector buses of said first, second and third sector bus sections, respectively, said first connector extension for said first sector bus of said first and second section lying in one plane at an angle to the arms of said last mentioned sector bus, said first extension for said first sector bus of said third section lying in one plane and being perpendicular to said first connector extension for said first and second sections, said second connector extension between said second sector bus in said first, second and third section lying in one plane, said third connector extension between said third sector buses in said first, second and third section lying in one plane.

12. In a bus run assembly comprising a first, second and third sector bus, support insulators, insulator support brackets, and a housing, said insulator support brackets positioned at spaced locations within said housing, each of said locations having a first, second and third insulator support bracket positioned at intervals of a hundred and twenty degrees around the interior of said housing, said insulator support brackets permanently secured to said housing, two insulators associated with each of said insulator support brackets, said insulator support brackets comprising an integral unit having a first and second leg, each of said sector buses comprising a unit having a first and second leg, said sector buses mounted and supported on said insulator support brackets by said insulators, said first sector bus associated with said first insulator support bracket, said second sector bus associated with said second insulator support bracket, said third sector bus associated with said third insulator support bracket, a first, second and third sector bus section forming a vertical T connection, connector extensions interconnecting said first, second and third sector buses of said first, second and third sector bus sections, respectively, said first connector extension for said first sector bus of said first and second section lying in one plane at an angle to the arms of said last mentioned sector bus, said first extension for said first sector bus of said third section lying in one plane and being perpendicular to said first connector extension for said first and second sections, said second connector extension between said second sector bus in said first, second and third section lying in one plane, said third connector extension between said third sector buses in said first, second and third sections lying in one plane, said second and third connector extensions lying in planes parallel to each other and parallel to at least one leg of said second and third sector bus.

13. In a bus run assembly comprising a first, second and third sector bus, a support insulator, an insulator support bracket, and a housing; said sector bus, insulator support bracket, and support insulator being positioned at spaced locations within said housing, each of said locations having a first, second and third insulator support bracket positioned at intervals of a hundred and twenty degrees around the interior of said housing, means for securing said insulator support bracket permanently to said housing, said insulator support brackets comprising an integral unit having a first and second leg, each of said sector buses comprising a unit having a first and second leg, said sector buses having a C-shape at one part thereof, a member secured to said insulator and seated in the hollow of said C-shape of said bus for carrying said bus and supported on said insulator support brackets through said insulator, said first sector bus associated with said first insulator support bracket, said second sector bus associated with said second insulator support bracket, said third sector bus associated with said third insulator support bracket, said sector buses being rigidly secured by said member to said insulator at alternate locations, said sector buses being slidably secured to said insulators at the remaining alternate locations, said rigid securement and said slidable engagement between said conductors and said insulators permitting the expansion of any one of said sector buses to be confined thereto without affecting the remaining sector buses, said insulators being positioned concentrically between said sector buses and said housing, said insulators having a compressive stress applied thereto when said sector buses are subjected to short circuit conditions.

References Cited in the file of this patent

UNITED STATES PATENTS

| | | |
|---|---|---|
| 1,110,128 | Gray | Sept. 8, 1914 |
| 1,588,142 | Rohrbach | June 8, 1926 |
| 1,998,803 | Collins | Apr. 23, 1935 |
| 2,288,078 | Fisher | June 30, 1942 |
| 2,400,223 | Cole et al. | May 14, 1946 |
| 2,439,956 | Wagner | Apr. 20, 1948 |
| 2,469,073 | McArthur | May 3, 1949 |
| 2,570,885 | Swerdlow | Oct. 9, 1951 |
| 2,763,710 | West | Sept. 18, 1956 |
| 2,763,711 | Rugg | Sept. 18, 1956 |